(12) United States Patent
Fuglsang et al.

(10) Patent No.: US 9,303,621 B2
(45) Date of Patent: Apr. 5, 2016

(54) WIND TURBINE BLADE WITH LONGITUDINALLY EXTENDING FLOW GUIDING DEVICE HAVING A PLATE-SHAPED ELEMENT

(75) Inventors: Peter Fuglsang, Vejle (DK); Stefano Bove, Lunderskov (DK); Peter Grabau, Kolding (DK); V.v. Subrahmanyam, Ongole (IN); Brian Lund, Esbjerg N (DK); Lars E. Jensen, Hedensted (DK); Sreeram Kottumuklu Radhakrishnan, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 818 days.

(21) Appl. No.: 13/500,573

(22) PCT Filed: Oct. 8, 2010

(86) PCT No.: PCT/EP2010/065078
§ 371 (c)(1),
(2), (4) Date: Apr. 5, 2012

(87) PCT Pub. No.: WO2011/042530
PCT Pub. Date: Apr. 14, 2011

(65) Prior Publication Data
US 2012/0201689 A1 Aug. 9, 2012

(30) Foreign Application Priority Data
Oct. 8, 2009 (EP) .................................... 09172592

(51) Int. Cl.
*F03B 3/12* (2006.01)
*F03D 1/06* (2006.01)

(52) U.S. Cl.
CPC ......... *F03D 1/0641* (2013.01); *F05B 2240/121* (2013.01); *F05B 2240/301* (2013.01); *F05B 2260/30* (2013.01); *Y02E 10/721* (2013.01)

(58) Field of Classification Search
CPC .............................. F03D 1/0608; F03D 1/0641
USPC ........................ 415/914; 416/235, 236 R, 237
See application file for complete search history.

(56) References Cited

U.S. PATENT DOCUMENTS 4,354,648 A * 10/1982 Schenk et al. ............. 244/200.1
5,058,837 A * 10/1991 Wheeler .................... 244/200.1

(Continued)

FOREIGN PATENT DOCUMENTS

| DE | 10 2006 017 897 A1 | 10/2007 |
| DE | 10 2008 002 930 A1 | 1/2009 |
| EP | 0 615 903 A1 | 9/1994 |
| EP | 1 845 258 A1 | 10/2007 |

(Continued)

*Primary Examiner* — Dwayne J White
*Assistant Examiner* — Jason Fountain
(74) *Attorney, Agent, or Firm* — Nath, Goldberg & Meyer; Jerald L. Meyer; Tanya E. Harkins (57) ABSTRACT

A wind turbine blade (10) for a rotor of a wind turbine (2) is provided with a longitudinally extending flow guiding device (70, 170) attached to the profiled contour. The flow guiding device comprises: a base (90, 190) having a first longitudinal end (91, 191) nearest the root end (16) and a second longitudinal end (92, 192) nearest the tip end (14), a first side (93, 193) nearest the leading edge (18) and a second side (94, 194) nearest the trailing edge (20), as well as a first surface (95, 195) and a second surface (96, 196), the first surface of the base being attached to the profiled contour, and the second surface facing away from the profiled contour. A longitudinally extending substantially plate-shaped element (97, 197) protrudes from the second surface (96, 196) of the base (90, 190).

20 Claims, 5 Drawing Sheets

(56) References Cited

U.S. PATENT DOCUMENTS

| | | |
|---|---|---|
| 6,910,867 B2 * | 6/2005 | Corten .................... 416/223 R |
| 7,070,144 B1 * | 7/2006 | DiCocco et al. ............ 244/3.21 |
| 7,927,070 B2 * | 4/2011 | Godsk et al. ................. 416/62 |
| 8,052,394 B2 * | 11/2011 | Petsche et al. ............... 416/235 |
| 8,162,590 B2 * | 4/2012 | Haag ............................ 415/4.3 |
| 2009/0226324 A1 * | 9/2009 | Garcillan Rueda et al. .. 416/223 R |

FOREIGN PATENT DOCUMENTS

| | | |
|---|---|---|
| GB | 404269 | 1/1934 |
| JP | 52-168140 | 6/1951 |
| WO | 0208600 A1 | 1/2002 |
| WO | 2007045244 A1 | 4/2007 |
| WO | 2007065434 A1 | 6/2007 |
| WO | 2007118581 A1 | 10/2007 |
| WO | 2009083987 A1 | 7/2009 |

* cited by examiner

WIND TURBINE BLADE WITH LONGITUDINALLY EXTENDING FLOW GUIDING DEVICE HAVING A PLATE-SHAPED ELEMENT

This is a National Phase Application filed under 35 U.S.C. §371 as a national stage of International Application No. PCT/EP2010/065078, filed Oct. 8, 2010, claiming the benefit from European Patent Application No. 09172592.9, filed Oct. 8, 2009, the entire content of each of which is hereby incorporated by reference in its entirety.

TECHNICAL FIELD

The present invention relates to a wind turbine blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising a profiled contour including a pressure side and a suction side, as well as a leading edge and a trailing edge with a chord having a chord length extending there between, the profiled contour, when being impacted by an incident airflow, generating a lift.

BACKGROUND ART

Ideally, a wind turbine blade of the airfoil type is shaped similar to the profile of an aeroplane wing, where the chord plane width of the blade as well as the first derivative thereof increase continuously with decreasing distance from the hub. This results in the blade ideally being comparatively wide in the vicinity of the hub. This again results in problems when having to mount the blade to the hub, and, moreover, this causes great loads during operation of the blade, such as storm loads, due to the large surface area of the blade.

Therefore, over the years, the construction of blades has developed towards a shape, where the blade consists of a root region closest to the hub, an airfoil region comprising a lift-generating profile furthest away from the hub and a transition region between the root region and the airfoil region. The airfoil region has an ideal or almost ideal blade shape with respect to generating lift, whereas the root region has a substantially circular cross-section, which reduces the storm loads and makes it easier and safer to mount the blade to the hub. The root region diameter is preferably constant along the entire root region. Due to the circular cross-section, the root region does not contribute to the energy production of the wind turbine and, in fact, lowers this a little because of drag. As it is suggested by the name, the transition region has a shape gradually changing from the circular shape of the root region to the airfoil profile of the airfoil region. Typically, the width of the blade in the transition region increases substantially linearly with increasing distance from the hub.

As for instance blades for wind turbines have become bigger and bigger in the course of time, and they may now be more than 60 meters long, the demand for optimised aerodynamic performance has increased. The wind turbine blades are designed to have an operational lifetime of at least 20 years. Therefore, even small changes to the overall performance of the blade may over the lifetime of a wind turbine blade accumulate to a high increase in financial gains, which surpass the additional manufacturing costs relating to such changes. For many years, the focus areas for research have been directed towards improving the airfoil region of the blade, but during the recent few years, more and more focus has been directed towards also improving the aerodynamic performance of the root and transition regions of the blade.

WO2007/065434 discloses a blade wherein the root region is provided with indentations and/or projections in order to decrease the drag from this part of the blade.

WO2007/045244 discloses a blade, wherein the root region and the transition region are designed so as to have at least two separate airfoil profiles in order to increase the lift of these regions.

WO0208600 describes a wind turbine, where the output of the wind turbine is increased by providing the root section of a wind turbine with a member that is designed in such a way that the assembly consisting of the member and the root section can absorb wind energy and increases the overall efficiency of the wind turbine.

WO2007/118581 discloses a blade, where the inboard part of the blade is provided with a flow guiding device on the pressure side of the blade in order to increasing the aerodynamic performance of the blade by increasing the lift. However, the design proposed is very rigid due to the triangular shaped cross-section and consequently the flow guiding device has a tendency to separate from the surface of the blade, when the blade bends.

DE 10 2008 002930 discloses a wind turbine blade provided with a flow guiding device comprising a base and a plate-shaped element extending in a transverse direction of the blade along a chord of the blade.

DISCLOSURE OF THE INVENTION

It is an object of the invention to obtain a new blade, and which overcomes or ameliorates at least one of the disadvantages of the prior art or which provides a useful alternative.

According to a first aspect of the invention, the wind turbine blade is provided with a longitudinally extending flow guiding device attached to the profiled contour, the flow guiding device comprising: a base having a first longitudinal end nearest the root end and a second longitudinal end nearest the tip end, a first side nearest the leading edge and a second side nearest the trailing edge, as well as a first surface and a second surface, the first surface of the base being attached to the profiled contour, and the second surface facing away from the profiled contour, wherein a longitudinally extending substantially plate-shaped element protrudes from the second surface of the base in direction from the first end towards the second end, wherein the flow guiding device is arranged so as to generate a separation of airflow from the pressure side of the blade at a point between the flow guiding device and the trailing edge of the blade, when the blade is impacted by the incident airflow. Thus, it is recognised that the flow guiding device is arranged between the leading edge and the trailing edge at a distance (i.e. with a spacing) from the trailing edge.

Compared to the known structure of the spoiler described in WO2007/118581 this structure has the advantage that it is more flexible and will reduce peel forces at the ends of the flow guiding device parts. Thereby, the base has a lower tendency to break off from the surface of the blade. Similar to the spoiler device described in WO2007/118581, the present device may be used as a high lift device for adding lift to certain longitudinal areas of the blade, thus contributing to the annual energy yield.

The flow guiding device is advantageously arranged substantially parallel to a longitudinal axis of the wind turbine blade, e.g. the pitch axis. Thus, the longitudinal direction of the flow guiding device and the longitudinal axis of the blade form an angle of less than 30 degrees, or less than 20 degrees.

The flow guiding device is preferably permanently attached to the surface of the wind turbine blade and cannot be actively controlled. Thus, the orientation of the front surface is non-adjustable. Also, it is recognised that the flow guiding device is utilised for increasing the lift and the energy yield. Thus, the flow guiding device may alternatively be denoted as a high lift device.

By incident flow is meant the inflow conditions at a blade section during normal use of the blade, i.e. rotation on a wind turbine rotor. Thus, the incoming flow is the inflow formed by the resultant of the axial wind speed and the rotational component as it is seen by the local section of the blade. By oncoming flow is meant the flow impinging the flow guiding device, i.e. the local flow on the pressure side of the blade meeting and impacting the flow guiding device.

According to an advantageous embodiment, the profiled contour is divided into: a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region. This corresponds to the design of conventional, modern wind turbine blades.

According to a particular advantageous embodiment, the flow guiding device is arranged in the transition region of the profiled contour, preferably on the pressure side of the blade. The device can increase the lift in the transition region and thus contribute to the energy yield. Advantageously, the flow guiding device extends substantially along an entire longitudinal extent of the transition region, thus contributing to the increased lift along the entire transition region.

Yet again, the flow guiding device may advantageously extend into the airfoil region. This will add lift to the airfoil region and thus increase the annual energy yield. In principle it may also extend into the root region. Also, the flow guiding device may be arranged in the root region alone, or in the airfoil region alone.

According to one advantageous embodiment, the plate-shaped element extends substantially along the entire longitudinal extent of the base.

According to a first embodiment, the plate-shaped element protrudes from the first side or the second side of the base. Thereby a simple embodiment is provided, wherein the flow guiding device as such is formed as an angle bar. According to a second embodiment, the plate-shaped element protrudes from a point between the first side and the second side of the base, e.g. a middle part. Accordingly, the plate-shaped element may extend substantially from the middle of the base.

According to one advantageous embodiment, the plate-shaped element is substantially planar. This provides a simple embodiment, which is easy and cheap to manufacture. According to another advantageous embodiment, the plate-shaped element is curved, e.g. convex or concave. This may in certain situations be advantageous, e.g. in order to obtain a smooth transition from the blade surface to the plate-shaped element. The plate shaped element can be moulded in the curved shape or be formed as a planar element, which subsequently is bent to the desired shape.

In one embodiment according to the invention, the plate-shaped element at a point of attachment forms a first angle with the base, the first angle being maximum 80 degrees, advantageously being maximum 70 degrees, more advantageously being maximum 60 degrees. According to another embodiment, the first angle is at least 100 degrees, or advantageously at least 110 degrees, or more advantageously at least 120 degrees. This embodiment is particularly relevant, if the point of attachment is found at the first side or the second side of the base. These embodiments provide simple solutions to angle the plate-shaped forward or backward, which contributes additionally to a pressure build up on the pressure side of the blade.

According to a first advantageous embodiment, the plate-shaped element is angled towards the trailing edge of the blade. Thus, the plate-shaped element is located substantially between the trailing edge and a surface normal to the base at the point of attachment (or seen from the inflow, behind said surface normal). In this embodiment, the plate-shaped element has an inflow surface corresponding to the inflow surface of the spoiler disclosed in WO2007/118581. The angle of the inflow surface and surface height of a distal point of the inflow surface may advantageously correspond to those described in European patent applications EP08171530.2 and EP08171533.6, respectively, by the present applicant. However, compared to e.g. WO2007/118581, this design has a huge structural advantage in not being as rigid.

According to a second advantageous embodiment, the plate-shaped element is angled towards the leading edge of the blade. Thus, the plate-shaped element is located substantially between the leading edge and the surface normal to the base at the point of attachment (or seen from the inflow, in front of said surface normal). Thus, when the profiled contour of the blade is impacted by the incident airflow, the flow guiding device creates an air pocket in front of the front surface, which increases the pressure in front of the flow guiding device, and which guides the airflow around the flow guiding device.

Preferably, the flow guiding device is formed as a longitudinally extending device. According to an advantageous embodiment, the flow guiding device extends along at least 5% of a longitudinal extent of the wind turbine blade. Yet again, the longitudinal extent of the flow guiding device may be at least 7%, 10%, 15%, or even 20% of the longitudinal extent or length of the blade.

According to another embodiment, the longitudinally extending flow guiding device extends along at least 1 meter of the blade, or at least 2 meters, or at least 3 meters, or at least 4 meters, or at least 5 meters, or at least 6 meters, or even at least 8 or 10 meters of the wind turbine blade.

In one embodiment, a minimum distance from the distal point to the profiled contour (or in other words the height of the flow guiding device), in at least the central longitudinal portion of the flow guiding device, decreases in the longitudinal direction towards the tip end. Alternatively, the height of the flow guiding device may be substantially constant in at least the central portion of the flow guiding device. The height may also vary in the longitudinal direction with alternating parts, in which the height increases, and parts, in which the height decreases.

In one advantageous embodiment, the base is formed of a flexible material. Thus, the bending stiffness of the base may be reduced and the base be bent to fit to the surface of the blade without introducing large stresses in a bond line between the base and the plate-shaped element. This may for instance be obtained by forming the base as a composite structure, such as polymer matrix material reinforced with glass fibres. The polymer matrix material may for instance be a polyurethane resin. Yet again, the base may be made of a polymer material, such as ABS plastic or polycarbonate.

Advantageously, a longitudinal extent of the flow guiding device is at least 0.5 meters, or at least 1 meter, or at least 2 meters, or at least 3 meters. Also, a width of the base, i.e. the distance between the first side and the second side of the base, is advantageously between 20 cm and 100 cm, or between 20 cm and 70 cm.

According to one advantageous embodiment, the first surface of the base is curved, and the curvature of the first surface may optionally vary in the longitudinal direction of the base. Thereby, this shape can substantially match the longitudinally varying surface curvature of the profiled contour of the wind turbine blade. However, according to one advantageous embodiment, the base is plane. Thus, it is feasible to manufacture the flow guiding device as an extruded or pultruded element.

The wind turbine blade may advantageously be made of a composite structure, such as a polymer matrix reinforced with a fibre material. The resin may be a thermosetting resin, such as epoxy, vinylester, polyester. The resin may also be a thermoplastic, such as nylon, PVC, ABS, polypropylene or polyethylene. Yet again the resin may be a thermosetting thermoplastic, such as cyclic PBT or PET. The flow guiding device may also be made of such composite materials. The polymer matrix material may also be a polyurethane resin. Yet again, the base may be made of a polymer material, such as ABS plastic or polycarbonate.

The flow guiding device (or flow guiding device parts) may be attached to the surface of the blade by adhering it to the surface of the blade. It may also be bolted or riveted to the surface of the blade. It can also be mounted to the surface of the blade by use of screws. In principle, it may also be possible to attach the flow guiding device to the surface of the blade by use of magnet means, if the flow guiding device and/or the blade comprises a magnetisable material.

According to another aspect, the invention provides a wind turbine comprising a number of blades, preferably two or three, according to any of the aforementioned embodiments.

BRIEF DESCRIPTION OF THE DRAWINGS

The invention is explained in detail below with reference to the drawing(s), in which.

DETAILED DESCRIPTION OF THE INVENTION

Figure 1:
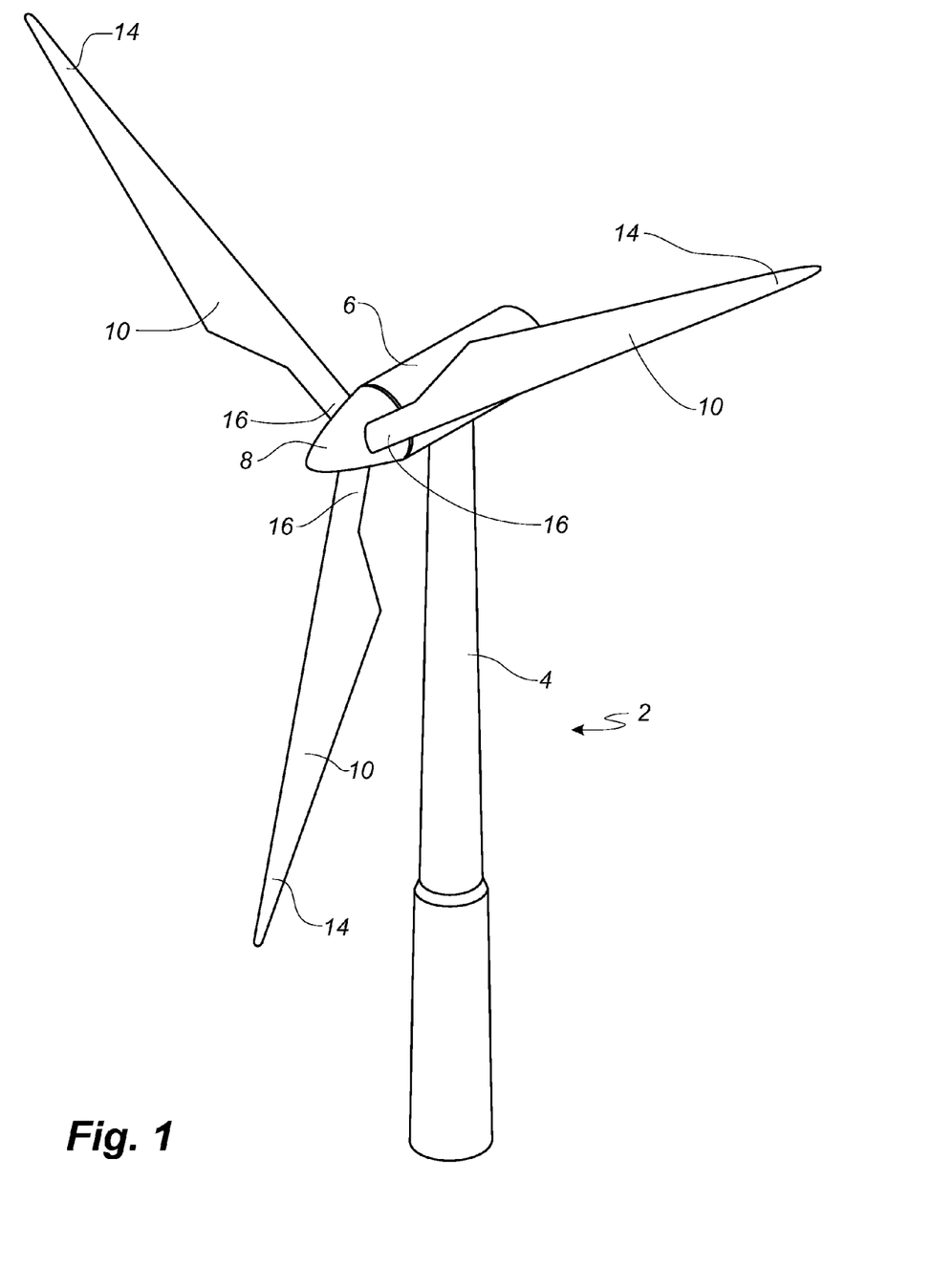
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 3:
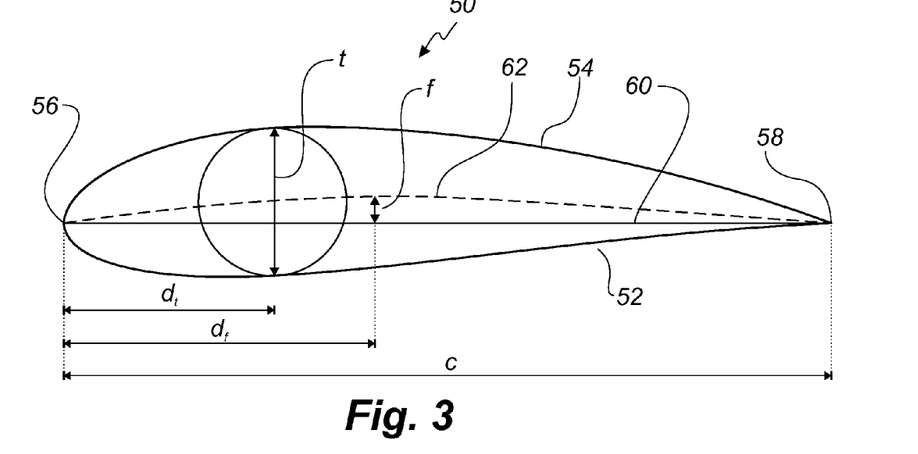
FIG. 3 shows a schematic view of an airfoil profile.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward side and the leeward side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Figure 2:
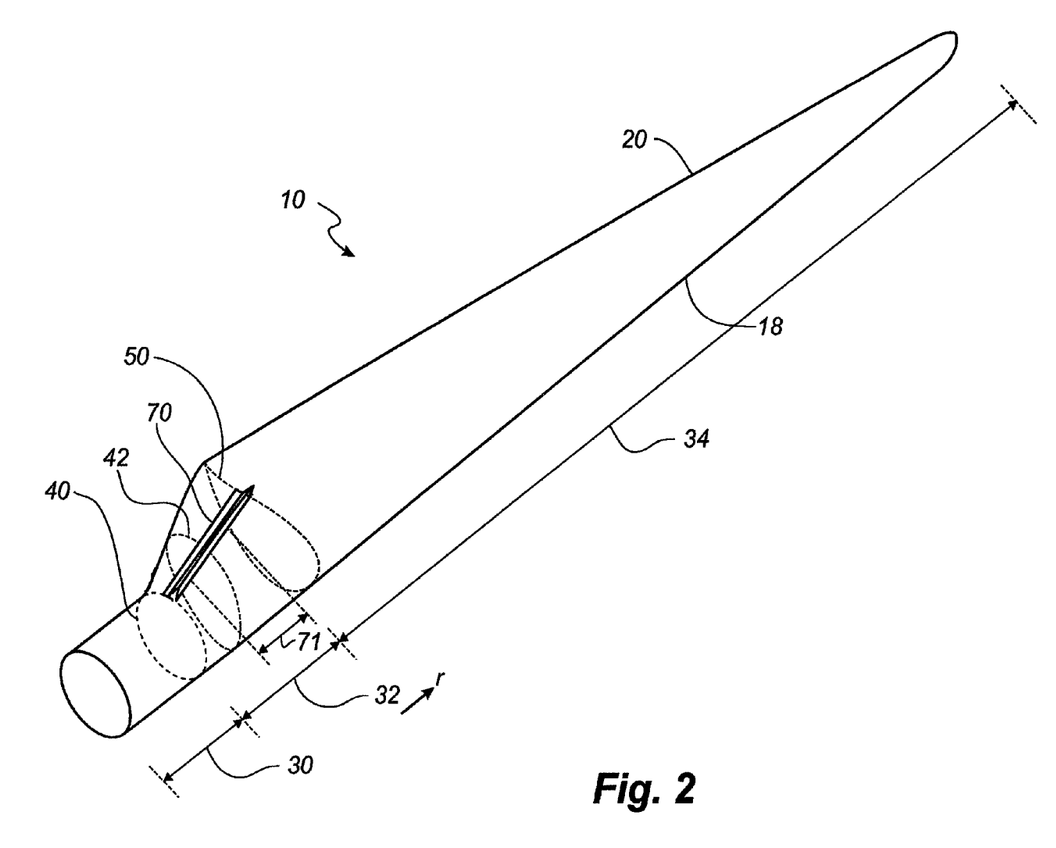
FIG. 2 shows a schematic view of a first embodiment of a wind turbine blade provided with flow guiding device parts according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The width of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 according to the invention is provided with a flow guiding device 70, which protrudes from the pressure side of the blade in at least the transition region 32 of the blade. But the element may also be arranged in other parts of the blade 10. In a particular advantageous embodiment, the flow guiding device 70 extends into the root region 30.

Figure 4:
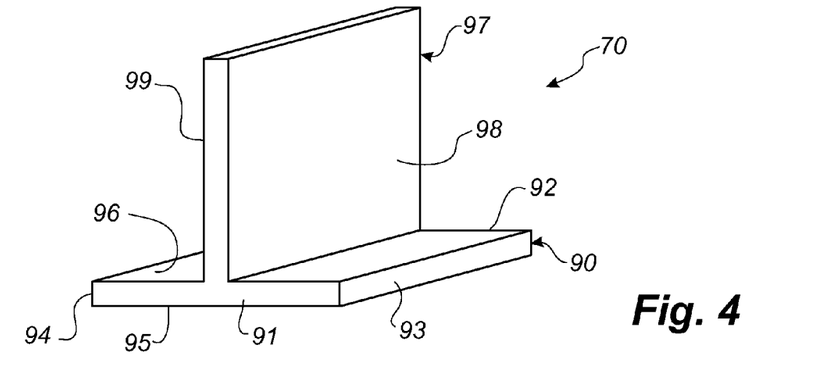
FIG. 4 shows a schematic view of a first embodiment of a flow guiding device according to the invention.

FIG. 4 shows a first embodiment of a flow guiding device 70 according to the invention. The flow guiding device is formed as a longitudinally extending device having a base 90. The base 90 comprises a first longitudinally end 91, which—when the flow guiding device 70 is attached to the profiled contour of the wind turbine blade 10—is arranged nearest the root end of the blade and a second longitudinal end 92, which is arranged nearest the tip end of the blade 10. The base 90 further comprises a first side 93 arranged nearest the leading edge 18 of the blade 10 and a second side 94 arranged nearest the trailing edge 20 of the blade. The base 90 also comprises a first surface 95, which is attached to surface of the blade 10, and a second surface, which faces away from the surface of the blade 10. A plate-shaped element 97 protrudes from the second surface 96 of the base 90 from a part substantially in the middle between the first side 93 and the second side 94. The plate-shaped element 97 extends longitudinally along the entire longitudinal extent of the base 90. The plate-shaped element comprises a front surface 98, which faces towards the leading edge 18 of the blade 10, and a back surface 99, which faces towards the trailing edge 20 of the blade 10. During operation of the wind turbine, the front surface 98 of the plate-shaped 97 element is thus impacted by an oncoming airstream. The plate-shaped element 97 functions as an obstruction to the flow on the pressure side of the profile. After the flow guiding device, i.e. between the flow guiding device and the trailing edge of the blade, a separation of the airflow occurs. This obstruction is resulting in a higher pressure after the flow guiding device, i.e. between the flow guiding device and the trailing edge of the wind turbine blade, due to a detachment of the flow. This higher pressure contributes to a higher lift in the longitudinal section, in which the flow guiding device 70 is arranged.

Figure 5:
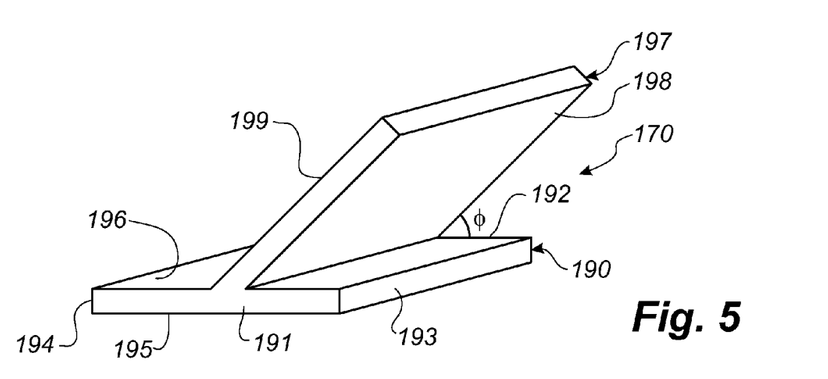
FIG. 5 shows a schematic view of a second embodiment of a flow guiding device according to the invention.

FIG. 5 shows a second embodiment of a flow guiding device 170 according to the invention, wherein like numerals refer to like parts of the embodiment shown in FIG. 4. Therefore, only the difference between the two embodiments is described. In this embodiment, the plate-shaped element 197 is angled forward so that the plate-shaped element 197 forms a first angle φ with the base 190. Thus, the front surface 198 also faces slightly downwards towards the base 190 and the surface of the blade 10. When the front surface 198 during normal operation of the wind turbine is impacted by an oncoming airstream, an air pocket is formed in front of the front surface, which increases the pressure in front of the flow guiding device, and which guides the airflow around the flow guiding device 170. Thus, an increased pressure is built up both in front of and behind the flow guiding device 170. Thereby, the lift is increased along a large part of the blade section. The first angle φ is advantageously at least 20 degrees and angles around 30 to 45 degrees have shown excellent results, both with respect to the gain in lift and with regards to the flexibility of the flow guiding device.

Figure 6:
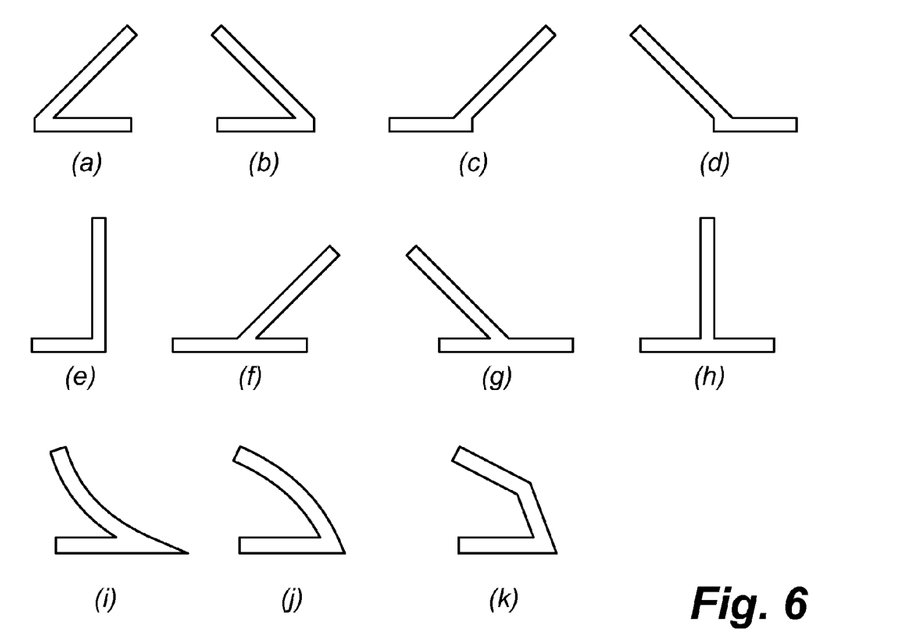
FIG. 6 shows cross-sections of various designs of flow guiding devices according to the invention.

However, the plate-shaped element need not be protruding substantially normal to the base (and the profiled contour of the blade) as shown in FIG. 4 or be forwardly angled as shown in FIG. 5. Also, the plate-shaped element need not be protruding from a middle part of the base. FIG. 6 shows variations of the cross-sectional design of the flow guiding device.

FIGS. 6 (a)-(e) show different examples of flow guiding devices, which as such are shaped as angle bars. In all the embodiments, it is assumed that the leading edge of the blade is arranged to the right and the trailing edge to the left. Thus, during normal operation of a wind turbine, the oncoming airstream is from the right to the left.

In embodiment (a), the plate-shaped element is angled forwards and protrudes from the second side of the base. In embodiment (b), the plate-shaped element is angled backwards and protrudes from the first side of the base. In these two embodiments, the angle between the plate-shaped elements of (a) and (b) forms an angle of 45 degrees with the base.

In embodiment (c), the plate-shaped element is angled forwards and protrudes from the second side of the base. In embodiment (d), the plate-shaped element is angled backwards and protrudes from the second side of the base. In these two embodiments, the plate-shaped element forms an angle of approximately 135 degrees with the base.

In embodiment (e), the plate-shaped element protrudes substantially normally to the base from the first side of the base.

Embodiments (f)-(h) show embodiments, where the plate-shaped element protrudes from a middle part of the base, i.e. between the first side and the second side of the base. The plate-shaped element may e.g. be forwardly angled as shown in embodiment (f), be backwardly angled as shown in embodiment (g) or protrude normally from the base as shown in embodiment (h).

In all the previous embodiments, the plate-shaped element is designed as a planar element. However, the plate-shaped elements of the previous embodiments may be slightly bent or curved, e.g. in a concave shape as shown in embodiment (i) or a convex shape as shown in embodiment (j). Yet again, the plate-shaped element may comprise different planar parts, which are differently angled with respect to the base, the plate-shaped element thus having a discontinuous design as shown in embodiment (k).

Figure 7:
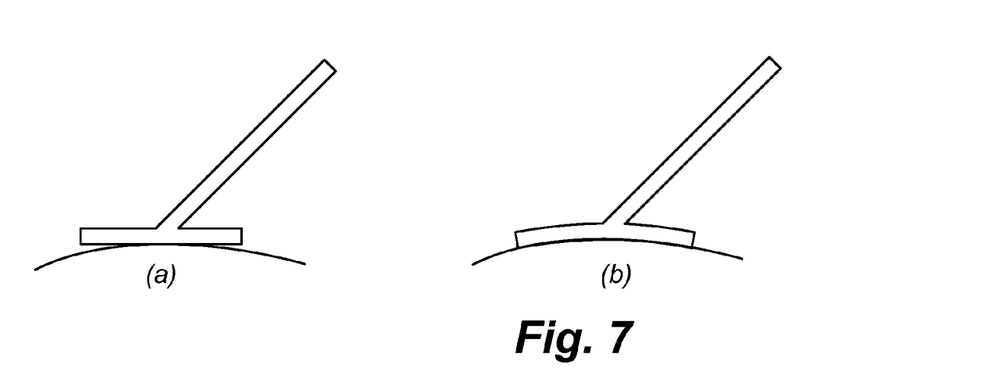
FIG. 7 illustrates the attachment of flow guiding devices to a surface of a wind turbine blade.

The flow guiding device is typically mounted on a curved surface of the wind turbine blade. Thus, the sides of the base may potentially detach slightly from the surface of the blade as shown in FIG. 7 (a). Accordingly, it is advantageous that the base of the flow guiding device is made of a flexible material so that stress formations are reduced along the entire base plate. Further, by making the plate-shaped element flexible, peel forces are reduced at the ends of the flow guiding device. This can be obtained by forming the base as a relatively thin plate, e.g. made of a composite material, such as a polymer matrix material reinforced with fibreglass. Alternatively, the base may be slightly curved as shown in FIG. 7 (b) so as to complement the surface of the wind turbine blade. The base may be attached to the surface of the blade by e.g. adhering the first surface of the base to the surface of the blade, or by connecting it to the blade via connection means, such as screws or nuts and bolts. It is also possible to mould the flow guiding device on to the surface of the blade. Yet again, the flow guiding device may be attached to the blade surface by use of magnet means, if for instance the base plate and/or the blade shell comprise a magnetisable material. Also, the curvature of the first surface of the base may vary in the longitudinal direction of the base in order to accommodate to the varying shape of the wind turbine blade.

Figure 8:
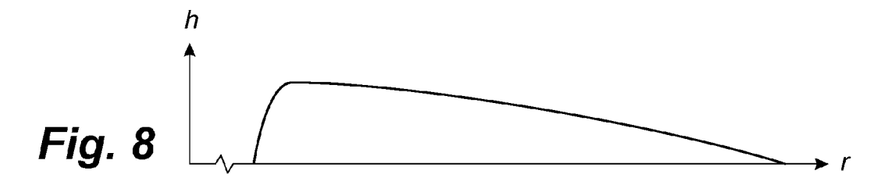
FIG. 8 shows a rear edge height of a first flow guiding device according to the invention as a function of the radial distance from the hub.

In a first embodiment, a height h of the flow guiding device may as shown in FIG. 8 be decreasing in the longitudinal direction (or radial distance from the hub) towards the tip end r of the blade—at least within the central longitudinal portion 71 of the flow guiding device. The height of the flow guiding device is shown as a function of the radial distance r from the hub in FIG. 8. At the longitudinal end of the flow guiding device 70 nearest the hub, the flow guiding device 70 is rounded or tapered in order to obtain a smooth transition to the profiled contour of the blade.

Figure 9A:
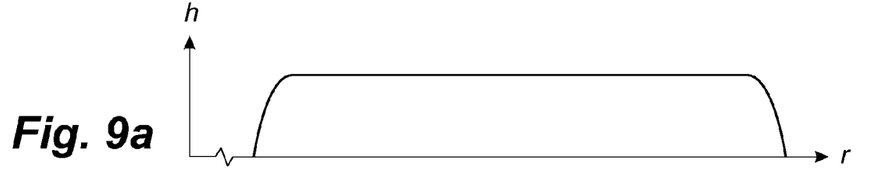
FIG. 9a shows the rear edge height of a second flow guiding device according to the invention as a function of the radial distance from the hub.

In a second embodiment, the height of the flow guiding device 70 is as shown in FIG. 9a substantially constant in the longitudinal direction of the blade, at least within the central longitudinal portion 71. Furthermore, it is seen that the flow guiding device 70 can be rounded or tapered near the longitudinal ends of the flow guiding device 70 in order to obtain a smooth transition to the profiled contour of the blade.

Figure 9B:
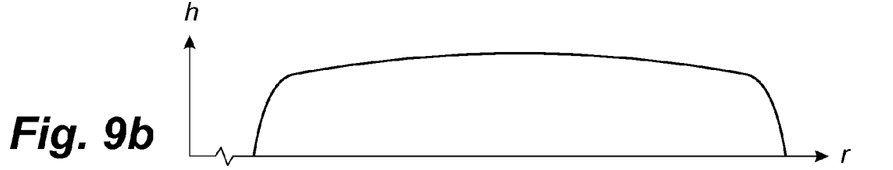
FIG. 9b shows the rear edge height of a third flow guiding device according to the invention as a function of the radial distance from the hub.

In a third embodiment, the height of the flow guiding device 70 increases in a first longitudinal part and decreases in a second longitudinal part as shown in FIG. 9*b*.

Figure 10:
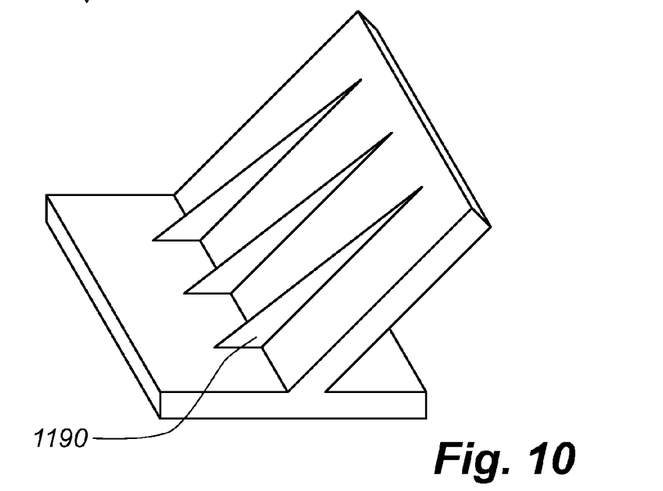
FIG. 10 shows an embodiment of a flow guiding device provided with stiffening members.

When the flow guiding device parts are shaped as a plate-shaped element angled forwardly as shown in FIG. 5, the device part may advantageously be provided with stiffening devices 1190 arranged at the back surface of the plate-shaped element as shown in FIG. 10. The stiffening devices may advantageously be formed as triangular shaped plates between the back surface and the base of the device. The stiffening devices are advantageously arranged substantially in the transverse direction of the blade, i.e. substantially parallel to the local chord.

Figure 11:
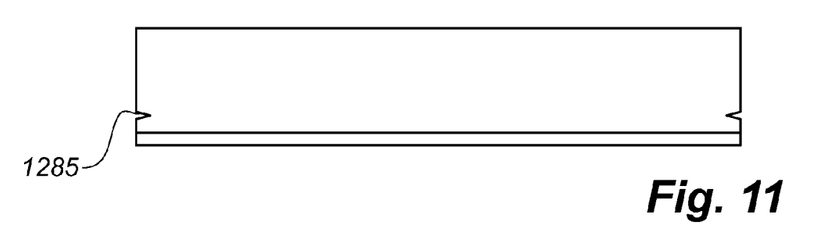
FIG. 11 shows an embodiment, where ends of the device are provided with notches.

The flow guiding device or individual modules of the group of flow guiding devices may advantageously be provided with a notch 1285, a cut or the like at one or both ends of the device as shown in FIG. 11. This will reduce stress concentrations and peel forces at the ends. The notches may be useful relevant shape such as triangular, rounded square or the like.

The invention has been described with reference to a preferred embodiment. However, the scope of the invention is not limited to the illustrated embodiment, and alterations and modifications can be carried out without deviating from the scope of the invention. For instance, only an embodiment in which the flow guiding device is arranged on the pressure side of the blade in the transition region of the blade is presented. However, advantageously, the flow guiding device also extends into the root region and/or the airfoil region of the blade. Yet again, the flow guiding device may in other advantageous embodiments be arranged on other parts of the blade, such as on the suction side of the blade or at the trailing edge of the blade as a Gurney like device.

The invention claimed is:

1. A wind turbine blade (10) for a rotor of a wind turbine (2) having a substantially horizontal rotor shaft, said rotor having a hub (8), from which the blade (10) extends substantially in a radial direction when mounted to the hub (8), the blade having a longitudinal direction (r) with a tip end (14) and a root end (16) and a transverse direction, the blade comprising:
a profiled contour (40, 42, 50) including a pressure side and a suction side, as well as a leading edge (18) and a trailing edge (20) with a chord having a chord length extending there between, the profiled contour, when being impacted by an incident airflow, generating a lift, characterised in that
the wind turbine blade is provided with a longitudinally extending flow guiding device (70, 170) on the pressure side of the blade attached to the profiled contour, the flow guiding device having:
a base (90, 190) having
a first longitudinal end (91, 191) nearest the root end (16) and a second longitudinal end (92, 192) nearest the tip end (14),
a first side (93, 193) nearest the leading edge (18) and a second side (94, 194) nearest the trailing edge (20), as well as
a first surface (95, 195) and a second surface (96, 196), the first surface of the base being attached to the profiled contour, and the second surface facing away from the profiled contour, wherein
a plate-shaped element (97, 197) protrudes from the second surface (96, 196) of the base (90, 190) in direction from the first end (91, 191) towards the second end (92, 192) such that it extends substantially in the longitudinal direction of the blade and the base, wherein the plate-shaped element is perpendicular to the airflow, wherein an angle between the longitudinal direction and a longitudinal axis of the blade is less than 30 degrees, wherein the plate-shaped element forms a first angle with the base, wherein the first angle with the base is not a perpendicular angle, and wherein
the flow guiding device (70, 170) is arranged so as to generate a separation of airflow from the pressure side of the blade at a point between the flow guiding device (70, 170) and the trailing edge (20) of the blade, when the blade is impacted by the incident airflow.

2. A wind turbine according to claim 1, wherein the profiled contour is divided into:
a root region (30) having a substantially circular or elliptical profile closest to the hub,
an airfoil region (34) having a lift-generating profile furthest away from the hub, and
a transition region (32) between the root region (30) and the airfoil region (34), the transition region (32) having a profile gradually changing in the radial direction from the circular or elliptical profile of the root region to the lift-generating profile of the airfoil region.

3. A wind turbine blade according to claim 2, wherein the flow guiding device (70) is arranged in the transition region (32) of the profiled contour on the pressure side of the blade (10).

4. A wind turbine blade according to claim 3, wherein the flow guiding device extends substantially along an entire longitudinal extent of the transition region.

5. A wind turbine blade according to claim 2, wherein the flow guiding device extends into the airfoil region.

6. A wind turbine blade according to claim 1, wherein the plate-shaped element extends substantially along the entire longitudinal extent of the base.

7. A wind turbine blade according to claim 1, wherein the plate-shaped element protrudes from the first side or the second side of the base.

8. A wind turbine blade according to claim 1, wherein the plate-shaped element protrudes from a point between the first side and the second side of the base, e.g. a middle part.

9. A wind turbine blade according to claim 1, wherein the plate-shaped element is substantially planar.

10. A wind turbine blade according to claim 1, wherein the plate-shaped element is curved, e.g. convex or concave.

11. A wind turbine blade according to claim 1, wherein the plate-shaped element at a point of attachment forms a first angle with the base, the first angle being maximum 80 degrees.

12. A wind turbine blade according to claim 11, wherein the plate-shaped element is angled towards the trailing edge of the blade.

13. A wind turbine blade according to claim 11, wherein the plate-shaped element is angled towards the leading edge of the blade.

14. A wind turbine blade according to claim 1, wherein the base is formed of a flexible material.

15. A wind turbine blade according to claim 1, wherein the first surface of the base is curved.

16. A wind turbine blade according to claim 15, wherein the curve of the first surface varies in the longitudinal direction of the base.

17. A wind turbine blade according to claim 1, wherein the plate-shaped element at a point of attachment forms a first angle with the base, the first angle being maximum 70 degrees.

18. A wind turbine blade according to claim 1, wherein the plate-shaped element at a point of attachment forms a first angle with the base, the first angle being maximum 60 degrees.

19. A wind turbine according to claim 1, wherein the flow guiding device is non-adjustable.

20. A wind turbine according to claim 1, wherein the flow guiding device increases a lift of a longitudinal section of the blade.

\* \* \* \* \*